UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

MANUFACTURE OF ALUMINUM CHLORIDE.

1,405,115. Specification of Letters Patent. Patented Jan. 31, 1922.

No Drawing. Application filed March 1, 1920. Serial No. 362,199.

*To all whom it may concern:*

Be it known that I, FRANK W. HALL, a citizen of the United States, residing in Port Arthur, in the county of Jefferson and State of Texas, have invented certain new and useful Improvements in the Manufacture of Aluminum Chloride, of which the following is a specification.

This invention relates to the production of aluminum chloride and has for its object to provide an improved method involving the use of an aluminum ore such as bauxite, sulphur and chlorine, the reaction being expressed according to my present knowledge and belief, as follows:

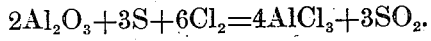

$$2Al_2O_3 + 3S + 6Cl_2 = 4AlCl_3 + 3SO_2.$$

One of the principal advantages of my process resides in the fact that it can be carried out at lower temperatures than are commonly required under existing methods, the low temperatures employed being due to two principal reasons: first, because the reaction is highly exothermic, and second, because all the substances entering into the reaction except the alumina are in a gaseous or vapor state.

One of the most common methods at present used for the manufacture of aluminum chloride, involves the mixing of soft coal and bauxite with a binder, coking the mixture and then chlorinating it. My invention represents a distinct advantage over methods of this type inasmuch as no coking step is required but the elementary substances, chlorin and sulfur are combined directly with alumina in a single operation.

The invention contemplates the contacting of alumina, sulfur and chlorin in such manner and under such temperatures that the resulting reaction produces anhydrous aluminum chloride. The sulfur and the chlorin are preferably introduced into the reaction chamber in the form of vapor. A convenient way of introducing the sulfur into the reaction chamber, however, is to melt it and allow it to flow in a liquid state to the chamber, the heat therein vaporizing it so that it will enter into the reaction. To obtain the necessary alumina for the reaction any suitable aluminous substance may be used, such as bauxite and various alumina containing clays, it being understood that wherever the word alumina is used in this specification or in the claims it is meant to include any suitable alumina containing material.

There are various ways in which my process may be carried out. In one method alumina is admitted to a suitable retort and chlorin and sulfur both in the form of vapor are introduced thereto while applying heat to the retort. In another variation of the process a molten solution of alumina is prepared which may be done by dissolving the alumina in some such substance as molten cryolite or in a bath of any suitable alkali halid or mixture thereof, and the sulfur and chlorin vapors are passed through the molten mixture. This is a very advantageous method of operation inasmuch as the two gases will readily react with the liquid alumina. In another method of operation an atmosphere of chlorin and sulfur is maintained under temperatures sufficient to produce aluminum chloride in a chamber into which powdered alumina is blown.

The aluminum chloride produced in the practice of any of the methods of my invention passes from the reaction chamber in the form of a vapor and may be collected or sublimed in any suitable manner.

What I claim is:

1. The process of producing aluminum chloride which consists in contacting alumina, sulfur and chlorin under a temperature sufficient for chemical action.

2. The process of producing aluminum chloride which consists in maintaining a molten solution of alumina and passing thereinto sulfur and chlorin vapors.

3. The process of producing aluminum chloride which consists in heating alumina to reaction temperatures in a chamber and passing chlorin and melted sulfur into the heated chamber where the sulfur vaporizes and the chlorin and sulfur vapors contact with the heated alumina.

4. The process of producing aluminum chloride which consists in reacting alumina, sulfur and chlorin according to the equation:

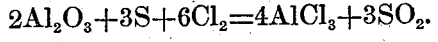

$$2Al_2O_3 + 3S + 6Cl_2 = 4AlCl_3 + 3SO_2.$$

5. The process of producing aluminum chloride which consists in heating alumina to reaction temperatures in a chamber containing chlorin and sulfur vapors.

6. The process of producing aluminum chloride which consists in contacting alumina, sulfur and chlorin while heated sufficiently for chemical reaction and collecting the aluminum chloride formed.

7. The process of producing aluminum chloride which consists in dissolving alumina in a molten material, passing chlorin and sulfur into contact with said molten material while heating the mass sufficiently for chemical reaction.

8. The process of producing aluminum chloride which consists in contacting an alumina containing substance, sulfur and chlorin under temperature sufficient for chemical reaction.

In witness whereof I have hereunto set my hand this 18th day of February, 1920.

FRANK W. HALL.